United States Patent
Magri et al.

(10) Patent No.: US 8,055,127 B2
(45) Date of Patent: Nov. 8, 2011

(54) WAVELENGTH DIVISION MULTIPLEX OPTICAL RING NETWORK

(75) Inventors: Roberto Magri, Parma (IT); Cornelius Furst, Auenwald (DE)

(73) Assignee: Ericsson AB, Stockholm (SE)

( * ) Notice: Subject to any disclaimer, the term of this patent is extended or adjusted under 35 U.S.C. 154(b) by 762 days.

(21) Appl. No.: 10/596,226

(22) PCT Filed: Nov. 22, 2004

(86) PCT No.: PCT/EP2004/053042
§ 371 (c)(1),
(2), (4) Date: Feb. 4, 2008

(87) PCT Pub. No.: WO2005/055476
PCT Pub. Date: Jun. 16, 2005

(65) Prior Publication Data
US 2008/0131121 A1    Jun. 5, 2008

(30) Foreign Application Priority Data
Dec. 3, 2003   (IT) .............................. MI2003A2365

(51) Int. Cl.
*H04B 10/08* (2006.01)
(52) U.S. Cl. .................. 398/18; 398/59; 398/9; 398/17; 398/25; 398/34; 398/37; 398/38; 398/83; 398/92; 398/177; 398/180
(58) Field of Classification Search .................. 398/1, 6, 398/7, 9, 11, 14, 17, 18, 21, 34, 37, 59, 83, 398/92, 97, 177, 180; 359/337
See application file for complete search history.

(56) References Cited

U.S. PATENT DOCUMENTS
5,969,840 A * 10/1999 Roberts ........................... 398/32
(Continued)

FOREIGN PATENT DOCUMENTS
WO    WO 02/080409    * 10/2002

OTHER PUBLICATIONS

Salehee: "Closed Cycle Lasing of ASE Noise in a WDM Ring Network", CLEO/Pacific Rim 2001, Jul. 15-19, 2001, vol. 2, pp. II-558-II-559*
Okamura, Haruo. "Automatic Optical Loss Compensation with Erblum-Doped Fiber Amplifier." Journal of Lightwave Technology, IEEE, New York, US, vol. 10, No. 8, Aug. 1, 1992, pp. 1110-1116, XP000288348. ISSN: 0733-8724.

*Primary Examiner* — Li Liu
(74) *Attorney, Agent, or Firm* — Coats & Bennett, P.L.L.C.

(57) ABSTRACT

A wavelength division multiplex optical ring network comprises optical fibre (1-4) arranged in a ring configuration and a plurality of doped fibre optical amplifiers (17-20) arranged in the ring. The spectral response in the ring is configured such in use amplified spontaneous emission (ASE) noise circulates around the ring in a lasing mode to clamp the gain of each doped fibre optical amplifier. Each optical amplifier (17-20) includes respective control means (28) which in use control the optical amplifier to produce a substantially constant output power or to maintain a substantially constant pump power. In the event of loss of the lasing peak, detection means switches the doped fibre optical amplifiers to a different mode of gain control, for example, a mode to produce constant gain at the value before the loss of the lasing peak. Optionally, after a predetermined delay, the optical amplifiers may revert to constant output power or pump power mode. Loss of the peak could be detected by a peak detection circuit (27), which filters by means of filter (26) a fraction of the input or output power of the optical amplifier using splitters and/or by detection of a drop in amplifier input power.

16 Claims, 2 Drawing Sheets

U.S. PATENT DOCUMENTS 6,175,436 B1 1/2001 Jackel
6,421,168 B1 7/2002 Allan et al.
7,019,894 B1 * 3/2006 Stentz et al. ............. 359/341.41

* cited by examiner

WAVELENGTH DIVISION MULTIPLEX OPTICAL RING NETWORK

This invention relates to wavelength division multiplex optical ring networks in which nodes of the network are connected by optical fibres in a serial manner to form a closed loop or ring configuration. Optical metropolitan networks, that is, networks spanning distances of up to hundreds of kilometers, are typically configured in a ring topology. Due to the loss in the optical fibres, a plurality of amplifiers are arranged in the ring, and it is necessary to stabilise their gains.

EP-A-0 497 491 discloses stabilisation of the gain of an individual doped fibre amplifier by the use of a loop which, in conjunction with a filter, feeds back to the amplifier input a proportion of the amplified spontaneous emission (ASE) in the amplifier output which is outside the signal bandwidth, thereby creating a lasing peak. This clamps the average ion population inversion, and hence the gain itself, to a desired value (which depends on the amount of optical pumping the amplifier receives and the amount of the feedback). The gain remains at its clamped value after channels are dropped or added to the signal.

This principle of gain clamping is known in the case of doped fibre amplifiers arranged in a ring, using a region of the spectrum containing protection channels to generate a lasing peak (W. Xin, G. K. Chang, B. Meagher, S. J. B. Yoo, J. Jackel, J. Young, H. Dai, G. Ellinas "The Benefits Of Closed Cycle Lasing in Transparent WDM Networks, Proc. ECOC 1999, Nice, France, September 1999).

In the case of doped fibre amplifiers arranged in a closed ring network, typically ASE is physically blocked at a point in the ring to prevent its re-circulation around the ring, because the re-circulation could cause instability in the ring.

However, International patent application publication number WO2004/06413 discloses deliberately allowing ASE to re-circulate around the ring and to give rise to a lasing peak that re-circulates around the ring. The spectral response in the ring is configured such that the lasing peak clamps the gain of each optical amplifier within the ring through a process of population inversion to clamp the overall population inversion of the optical amplifier chain. The spectral response can be configured by including one or more variable optical attenuators within the ring. The network is further configured to ensure that the lasing peak occurs with a wavelength region of the spectrum that is separate to that occupied by the communication channels. Such a network provides the advantage that each optical amplifier no longer needs to include hardware to control the gain of the amplifier thereby reducing the overall network cost. Moreover since the gain is clamped in dependence upon ASE noise the gain is unaffected by the number or wavelength of communications channels present that can vary during operation of the network.

The inventors have appreciated that in a network in which re-circulation of ASE noise is used to control the gain, maintaining stable operation can be difficult and will be affected if closure of the ring is broken or otherwise impaired by for example micro-bending of the fibre or ageing of components. The present invention arose in an endeavour to address these problems.

According to the present invention a wavelength division multiplex optical ring network comprises optical fibre arranged in a ring configuration and a plurality of doped fibre optical amplifiers arranged in the ring, in which the spectral response in the ring is configured such in use amplified spontaneous emission (ASE) noise circulates around the ring in a lasing mode to clamp the gain of each doped fibre optical amplifier; the network is characterised in that each optical amplifier includes respective control means which in use control the optical amplifier to produce a substantially constant output power or to maintain a substantially constant pump power. By controlling each amplifier in a constant output power mode, or maintain a constant pump power, whilst clamping the gain of the amplifiers by re-circulation of the ASE lasing peak improves overall stability of the ring.

Advantageously the network is configured such that the ASE lasing peak is located in a wavelength region of the spectrum separate to that of the communications channels. Conveniently, the required spectral response can be obtained by appropriate design of the optical amplifiers, such as by suitable design of dynamic gain flattening filters (DGFF) in the amplifiers.

If the attenuation in one or more spans in the ring changes, the lasing peak could move in terms of wavelength or, in the case of a break in the fibre, could disappear altogether. Advantageously the network further comprises detection means arranged to switch control of the doped fibre optical amplifiers to a different mode of operation, i.e. out of a constant power mode or constant pump power, in response to detection of the absence of the lasing peak.

As described the optical amplifiers are preferably arranged to operate in a mode in which the output power, or the pump power, is maintained constant, when the lasing peak is detected as being present. Advantageously the detection means is arranged to switch the optical amplifiers to a gain control mode after detecting loss of the lasing peak in which the gain before the loss of the lasing peak is maintained.

Preferably the optical amplifiers are arranged to switch to constant output power mode, or constant pump power mode, after a predetermined delay after the gain control mode has been established.

Advantageously the detection means includes means for tapping a fraction of the input or output power of each optical amplifier, and detectors for measuring the input and/or output powers. In one embodiment the detection means further includes a filter for passing only ASE noise, and a detector for detecting the presence or absence of the lasing peak Alternatively the detection means includes a filter for passing only ASE noise, and a detector for detecting a simultaneous decrease in the powers of both the ASE noise peak and the total power input.

In a preferred arrangement the detection means includes a detector for detecting a decrease in the power of the input to each optical amplifier.

Advantageously the optical network further comprises means for changing the working point of the optical amplifier to restore the level of the ASE peak in the event of slow drift of the optical amplifiers.

An optical network in accordance with the invention will now be described in greater detail, by way of example only, with reference to the accompanying drawings, in which.

Figure 1:
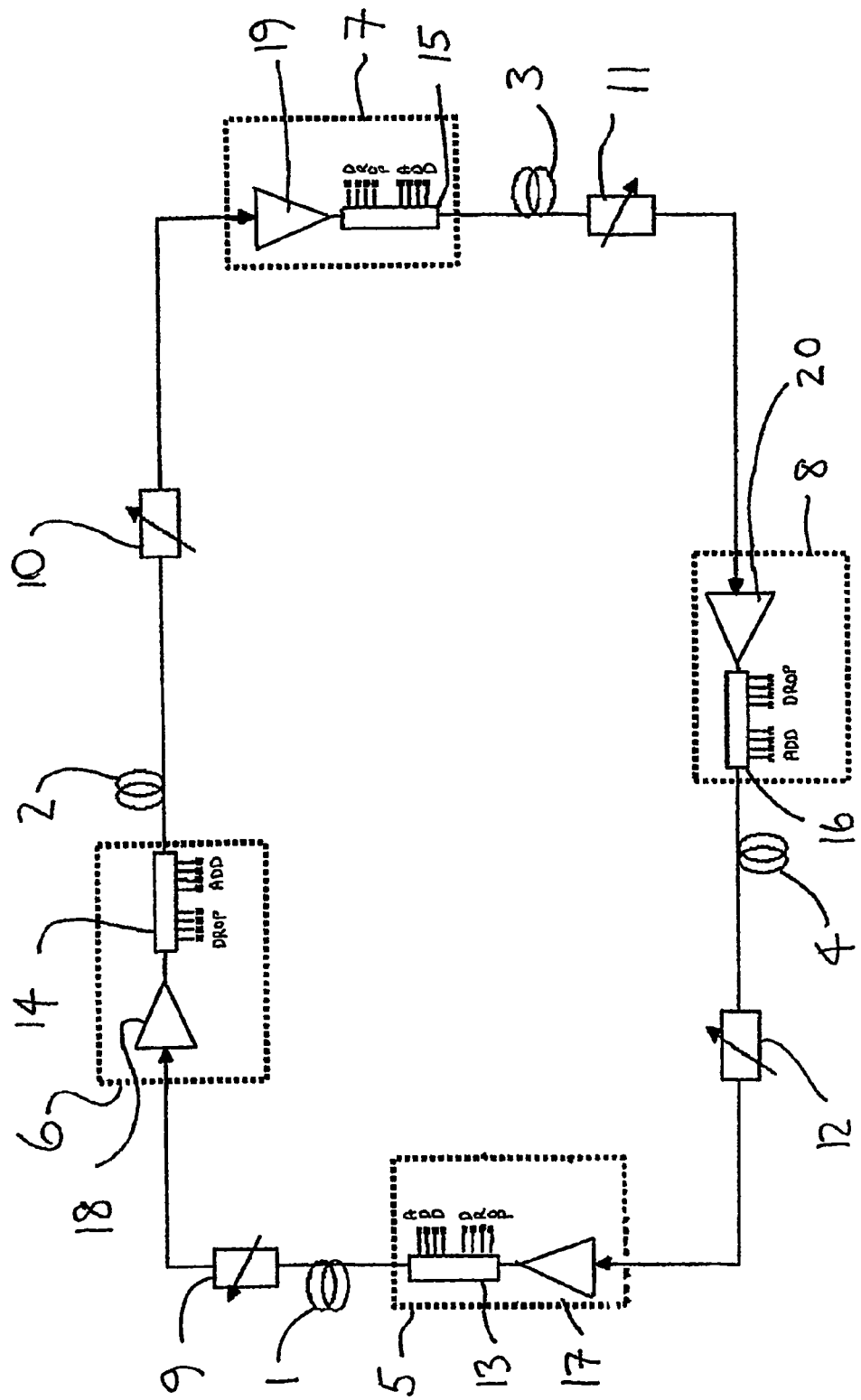
FIG. 1 shows in schematic form the optical network, having four nodes.

Referring to FIG. 1, the optical network is a metropolitan network, typically between 50 km and 250 km in length, having four fibre spans 14 joined by nodes 5-8, and also including respective attenuators 9-12. Each node contains a respective add/drop multiplexer 13-16 at which a number of channels can be dropped and a number of channels can be added, together with a respective optical amplifier 17-20, such as a doped fibre amplifier, for example an erbium doped fibre amplifier (EDFA). The attenuators 9-12 are contained within the amplifiers 17-20. The attenuators (slow) control the input to the amplifiers, thus producing a certain gain. This ensures a certain spectral tilt which is needed to keep the lasing wavelength on the ASE peak. Each optical amplifier includes dynamic gain flattening filters (DGFF) (not shown).

Figure 2:
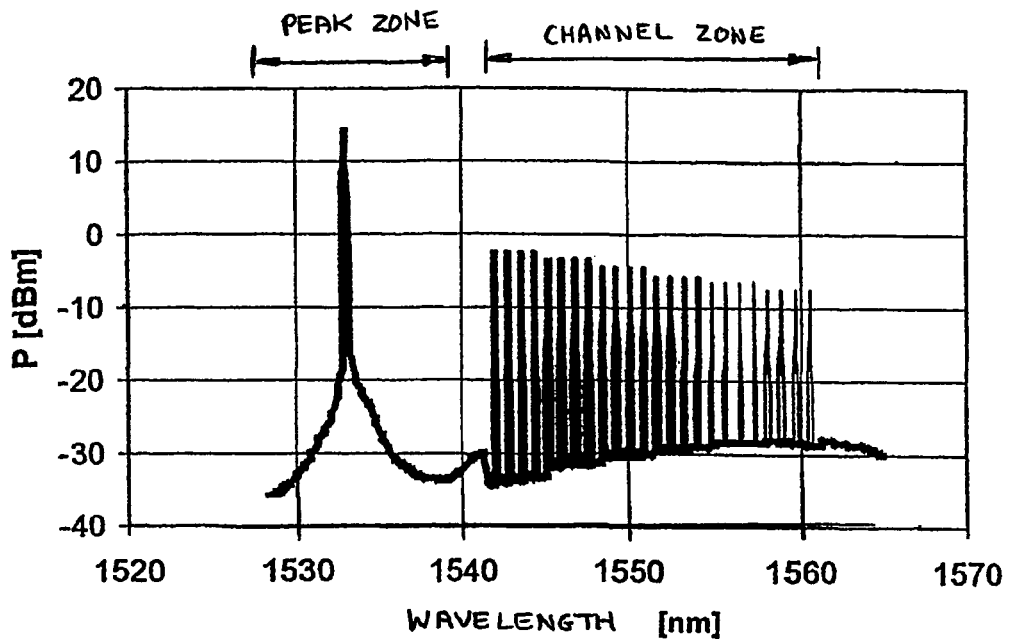
FIG. 2 shows the optical spectrum of the signal propagating around the ring.

FIG. 2 shows the transmission spectrum at an arbitrary position in the ring (for example, the output of an amplifier). The principle of operation is to force the peaking-noise to rise in a spectral region where no channels are placed. In this way the spectrum is divided into two regions, namely, the left hand region where ASE is allowed to peak, and the separate, right hand, region accommodating signal channels, for example, twenty-four. It will be noted that, in FIG. 2, the lower wavelength channels have somewhat higher power and signal to noise ratio than the higher wavelength channels, indicating that they have propagated a shorter distance, perhaps through one node when the higher wavelength channels have propagated through more nodes. The lasing peak has a round-trip gain of exactly one (unity), other channels have a gain of less than one, therefore they lose some power at each amplifier. For example, the gain at the lasing peak at each optical amplifier could be 1 dB higher than for the signal channels. Thus, for each node traversed by the optical signal, the signal channels would lose 1 dB of power at each node.

As the ASE noise circulates around the ring, it is attenuated in the fibre spans, but it is amplified in the optical amplifiers and, if the degree of amplification is sufficient, a lasing mode will take place. The gain of the amplifier must exceed losses at the lasing wavelength, thereby clamping the overall population inversion of the optical amplifier chain. Since the spans are fixed, this amounts to clamping the optical inversion of each optical amplifier.

A consequence of the clamped optical inversion and clamped gain is that the gain of the signal channels is also fixed, since this also depends on the population inversion. Thus, the gain is independent of the channel count Adding or dropping channels will not change the power level of the other channels. It is the level of the ASE lasing peak which changes to stabilise the gain.

The optical amplifiers 17-20 are, in addition, operated in power control mode. With power control mode, the output power change is zero, regardless of any input power change. This is achieved by monitoring the power output of each optical amplifier, for example, with a photodiode 24 such as described hereinafter with reference to FIG. 3, and using a feedback loop, such that output power fluctuations can be used as an error signal for the pump of the optical amplifier. Alternatively, a feed forward control to achieve constant output power can be used. It is usual for the working point of optical amplifiers to be in saturation, but the provision of power control in addition results in more accurate control of the output. Since the total output of each optical amplifier is constant, then the total input to the next optical amplifier is also constant, unless the span loss has changed or a channel has been added in between. Adding channels does not change the total output, but changes the relative power of the lasing signal and the channels. (At the input and output of the optical amplifiers, the gain and inversion remains constant).

Figure 3:
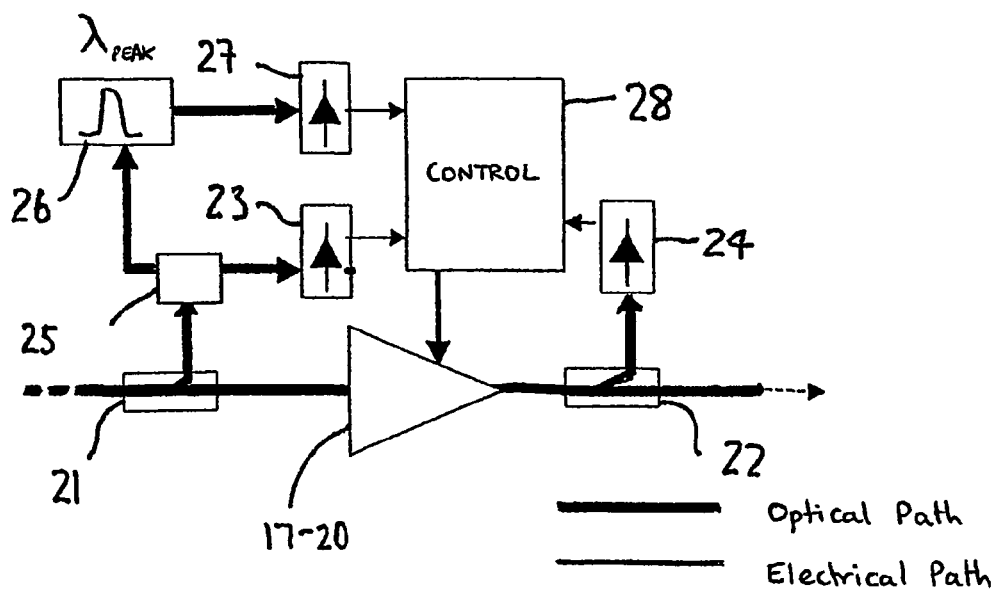
FIG. 3 shows in schematic form the optical amplifier card present in each of the nodes of the network shown in FIG. 1.

A problem can arise with the arrangement described thus far if the peak moves due to changes in span attenuation, or disappears altogether if the fibre was severed or if there was a fault in an optical amplifier. It is for this reason that the optical amplifier card of each optical amplifier detects the absence of the lasing peak, and switches the optical amplifiers to a different mode of operation in such a case. Referring to FIG. 3, which shows the card of one optical amplifier, splitters 21 and 22 tap a small proportion of the input and output optical power, respectively, for each optical amplifier. Photodiodes 23 and 24 are provided to measure the power tapped off. In addition, a proportion of the input power tapped off is fed by a further splitter 25 to an optical filter 26 which passes only those wavelengths of the ASE noise. A photodiode 27 measures the power of the tapped off ASE noise. The electrical signals forming the output of the photodiodes are fed to control logic circuitry 28.

In use, the control logic monitors the power in the ASE peak using a peak detection threshold circuit (not shown). When the loss of the ASE peak is detected, the optical amplifiers switch to a gain-controlled mode.

If power or pump control were to be maintained, the channel power levels would suddenly increase (within some tens of microseconds) to levels which were too high, due to the lack of the lasing signal, the amplifiers still being in saturation.

However, with gain control, the optical amplifiers are urged to keep approximately the optical gain that was provided by the optical amplifier before the loss of the ASE peak. The switch to gain control reduces the pump power, due to the loss of the lasing peak. After a short, predetermined period, for example, one second, the actual obtained output power can be read, and operation of the optical amplifiers can be switched back to power control operation with this new output power level.

In order to enable the change from power control to gain control and, possibly, back to power control, to be accomplished, the input and output optical power is monitored, and the power of the pump (not shown) of the optical amplifier adjusted as necessary. This may be done by a feedback control, a feed-forward control using the measured input power, or a combination of both, in the case of power control and in the case of gain control. If the optical amplifier is in a constant output power mode, it is only necessary to monitor the input power, since the output power is known and fixed.

An advantage of the system is that it is still able to handle addition or removal of a channel when the ring is broken. There could be some reduced stability for a chain of optical amplifiers operated in this way, due to a build-up of power fluctuations. The disadvantage of such electronically controlled operation is that it is not stable in a closed ring configuration, and it is only suitable for when the ring is broken.

It is not essential to revert to power control once the gain control settings have been established after loss of the lasing peak. As an alternative, gain control could be maintained. As another alternative, the optical amplifiers could be controlled instead to maintain constant pump settings once the gain control settings have been established. This makes the ring inflexible until the fault is repaired, but gives higher stability.

The control logic continually monitors the output of the filter 26, so that if the ASE peak returns, normal inversion clamping takes place again.

The optical amplifier card could be housed anywhere in the respective node, for example, in the add/drop multiplexer.

Variations are of course possible without departing from the scope of the invention. Thus, the filter 26 and peak detector 27 could monitor the output power of the optical amplifier to detect the lasing peak, instead of the input power. Equally, instead of detecting the break in ring circulation only by means of a filter 26 and a threshold detector, the peak ASE may be monitored as described but, simultaneously, the control logic could also monitor the total input power. The response of both could be correlated to ensure that a ring break would only be recognised when both ASE peak and total power decreased significantly. If both signals fell below their respective thresholds, the ring break would be declared.

As a further alternative to detect ring break, the total input power into the amplifier could be monitored in order to detect the condition. In normal operation, the gain as well the total output of the optical amplifiers is constant, and therefore the total input power in a re-circulating ring is constant. A ring break leads to reduction of the total input power due to the loss of the lasing signal. A fibre break would be declared when the input power fell below the constant value within a specified time interval. This method would gives less security against incorrect break detection since it does not distinguish between loss of the re-circulation and a transient loss in the fibre which may be generated for example by micro-bending of fibres.

As a further alternative, the network can be made to accommodate drift of the peak. Thus, if the span attenuation changes, the peak could move slowly. The detected power would decrease, for example, below the threshold. To counter this in the event of slow drift, the amplifier working point could be changed to restore the level of the ASE peak.

The invention allows the use of an amplified re-circulating ring as a metro WDM (wave division multiplex) ring exploiting its benefits and retaining protection features. Among the benefits are a simplified ring management, where each network element does not need any information about the actual number of channels in the system. It allows an easy operation (plug & play) regarding channel upgrade.

The invention claimed is:

1. A wavelength division multiplex optical ring network comprising:
   optical fiber arranged in a ring configuration;
   a plurality of doped fiber optical amplifiers arranged in the ring, wherein a spectral response in the ring is configured such that amplified spontaneous emission (ASE) noise, concentrated in a lasing peak separated in frequency from the wavelengths allocated to communication channels, circulating around the ring in a lasing mode is used to clamp a gain of each doped fiber optical amplifier;
   a controller associated with each optical amplifier to control the optical amplifier to produce a substantially constant output power or to maintain a substantially constant pump power; and
   detector circuitry configured to switch the optical amplifiers to a gain control mode after detecting a loss of a lasing peak to maintain a gain substantially at a level provided by the optical amplifiers prior to the detected loss.

2. The optical network of claim 1 wherein the optical amplifiers are configured to switch to a constant output power mode after a predetermined delay after the gain control mode has been established.

3. The optical network of claim 1 wherein the optical amplifiers are configured to switch to a constant pump power mode after a predetermined delay after the gain control mode has been established.

4. The optical network of claim 1 wherein the detector circuitry further comprises:
   a plurality of splitters configured to tap a fraction of each optical amplifier's input power; and
   a plurality of photodiodes configured to measure the input power.

5. The optical network of claim 4 wherein the plurality of splitters are further configured to tap a fraction of each optical amplifier's output power, and wherein the plurality of photodiodes are further configured to measure the output power.

6. The optical network of claim 4 wherein the detector circuitry further comprises a filter to pass only ASE noise, and a peak detector to detect the presence or absence of the lasing peak.

7. The optical network of claim 4 wherein the detector circuitry further comprises a filter to pass only ASE noise, and control logic to detect a simultaneous decrease in the powers of both the ASE noise peak and the total power input.

8. The optical network of claim 4 wherein the detector circuitry further comprises a detector to detect a decrease in the input power to each optical amplifier.

9. The optical network of claim 1 wherein a working point of the optical amplifiers is changed while in use to restore a level of the ASE peak in the event of a slow drift of the optical amplifiers.

10. A doped fibre optical amplifier for a wavelength division multiplex optical ring network comprising optical fibre arranged in a ring configuration, the optical amplifier comprising:
    a controller configured to control an optical amplifier to produce a substantially constant output power, or to maintain a substantially constant pump power using amplified spontaneous emission (ASE) noise, concentrated in a lasing peak separated in frequency from wavelengths allocated to communication channels, circulating around a ring in a lasing mode to clamp a gain of the optical amplifier; and
    detector circuitry configured to switch control of the optical amplifier to a gain control mode after detection of a loss of the lasing peak in which the gain before the loss of the lasing peak is maintained.

11. The optical amplifier of claim 10 wherein the detector circuitry is further configured to switch to a constant output power mode, or a constant pump power mode, after a predetermined delay after the gain control mode has been established.

12. The optical amplifier of claim 11 wherein the detector circuitry comprises:
    splitters configured to tap a fraction of the input or output power of the optical amplifier; and
    one or more detector components configured to measure the input and/or output powers.

13. The optical amplifier of claim 12 wherein the detector circuitry further comprises;
    a filter configured to pass only ASE noise; and
    a first detector component configured to detect a presence or absence of the lasing peak.

14. The optical amplifier of claim 12 wherein the detector circuitry further comprises:
    a filter configured to pass only ASE noise; and
    a first detector component configured to detect a simultaneous decrease in the powers of both the ASE noise peak and the total power input.

15. The optical amplifier of claim 12 wherein the detector circuitry further comprises a first detector component configured to detect a decrease in the power of the input to the optical amplifier.

16. The optical amplifier of claim 10 wherein a working point is changed in use to restore the level of the ASE peak the optical amplifier drifts.

* * * * *

UNITED STATES PATENT AND TRADEMARK OFFICE
CERTIFICATE OF CORRECTION

PATENT NO. : 8,055,127 B2
APPLICATION NO. : 10/596226
DATED : November 8, 2011
INVENTOR(S) : Magri et al.

It is certified that error appears in the above-identified patent and that said Letters Patent is hereby corrected as shown below:

On the Title Page, in Item (56), under "OTHER PUBLICATIONS", in Column 2, Line 5, delete "Erblum-Doped" and insert -- Erbium-Doped --, therefor.

In Column 2, Line 39, delete "peak" and insert -- peak. --, therefor.

In Column 2, Line 62, delete "14" and insert -- 1-4 --, therefor.

In Column 6, Line 46, in Claim 13, delete "comprises;" and insert -- comprises: --, therefor.

Signed and Sealed this
Tenth Day of April, 2012

David J. Kappos
*Director of the United States Patent and Trademark Office*